F. THEILLIER.
AGRICULTURAL AUTOMOBILE TRACTION ENGINE.
APPLICATION FILED SEPT. 19, 1911.

1,037,080.

Patented Aug. 27, 1912.

2 SHEETS—SHEET 2.

Witnesses

Inventor:
François Theillier
By ____ Attorney

UNITED STATES PATENT OFFICE.

FRANÇOIS THEILLIER, OF LE GRAND PRIEL, FRANCE.

AGRICULTURAL AUTOMOBILE TRACTION-ENGINE.

1,037,080.

Specification of Letters Patent.

Patented Aug. 27, 1912.

Application filed September 19, 1911. Serial No. 650,074.

*To all whom it may concern:*

Be it known that I, FRANÇOIS THEILLIER, a citizen of the French Republic, and resident of Le Grand Priel, Aisne, France, have invented certain new and useful Improvements in Agricultural Automobile Traction-Engines, of which the following is a specification.

This invention relates to automobile traction engines, designed primarily for use with agricultural machines.

The object of the invention is to provide means whereby the four wheels of the automobile are driven.

The invention also comprehends improvements in the details of construction and arrangement of parts which will be hereinafter described and particularly pointed out in the claims.

Figure 1:
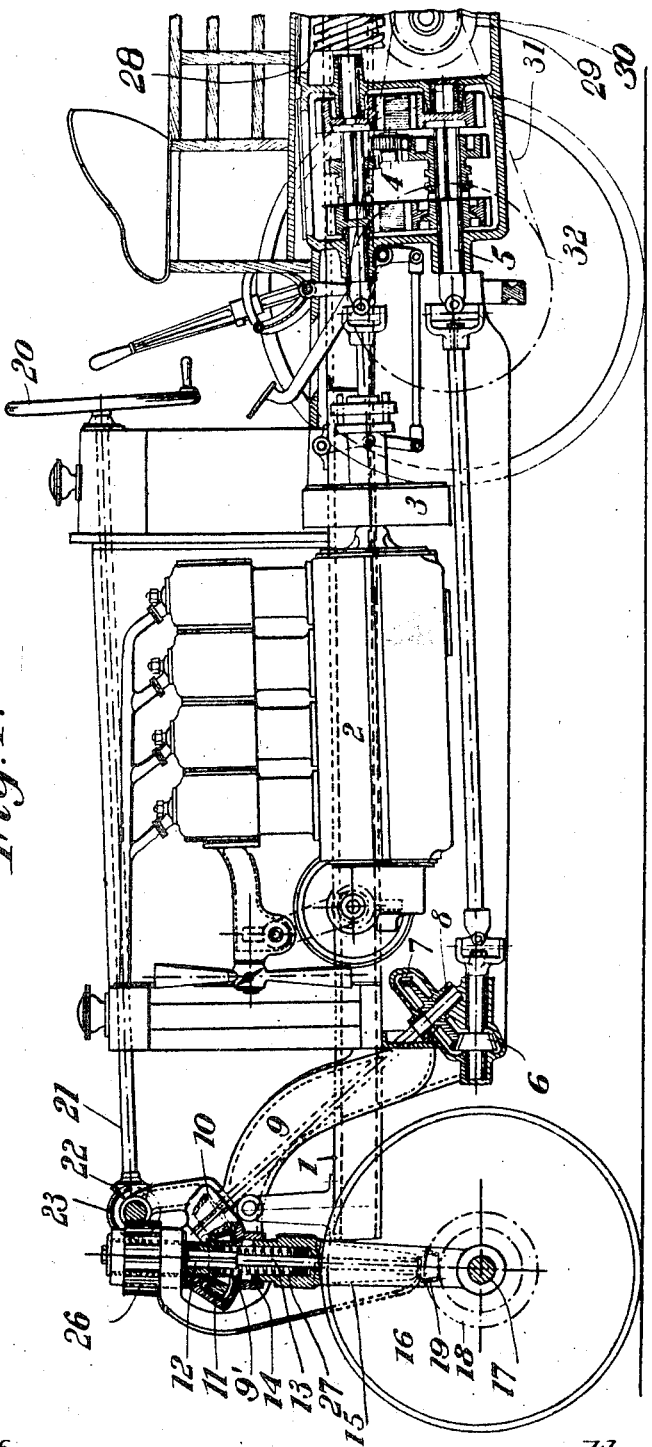
Figure 2:
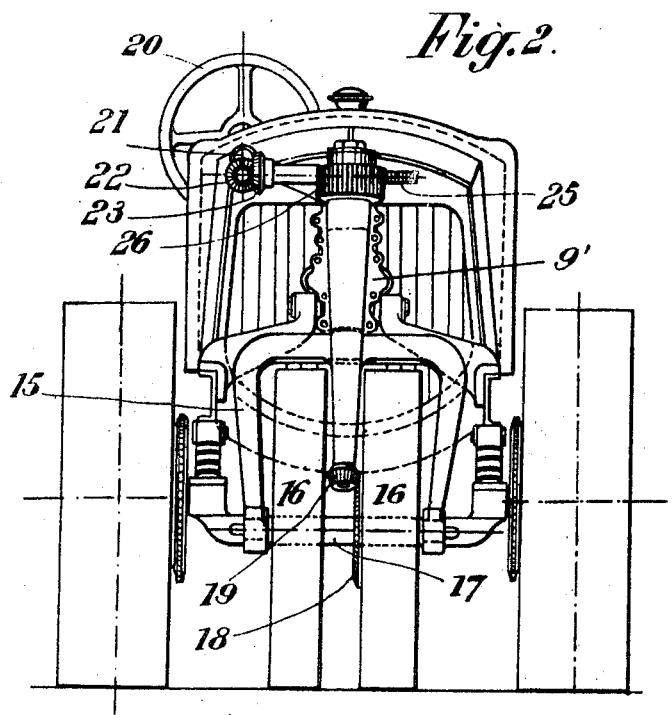
Figure 3:
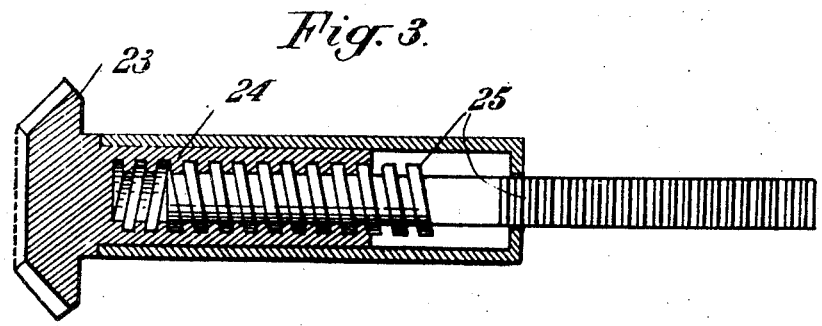

In the accompanying drawing: Figure 1 is an elevation partially in section of my improved machine. Fig. 2 is a front elevation. Fig. 3 is a detail longitudinal section of a part of the steering device.

The frame of the machine comprises U-shape irons which are conveniently stayed and which support a motor 2, with which a clutch 3, coöperates.

4 indicates suitable speed and reversing mechanism including a counter shaft 5, all of which specifically forms no part of my present invention.

The counter shaft 5, extends forwardly and is provided with universal joints, and near its front end is a pinion 6, which meshes with a bevel wheel 7, keyed on an intermediate shaft 8, mounted in the forked frame 9, on the front of the machine. The upper forward end of the frame 9, is provided with a housing 9', to inclose two pinions 10 and 11. The pinion 10, is keyed on the upper end of the shaft 8, and meshes with the pinion 11, which is slidably mounted on the squared portion 12, of a vertical shaft 13, mounted in the interior of a steering tube 14, of a front fork 15, which supports the front wheels 16. Interposed between the fork 15, and the pinion 11, and encircling the shaft 13, is a spring 27.

The two steering wheels 16, are keyed on a shaft 17, mounted in the lower ends of the fork 15, and secured on the shaft between the wheels is a bevel gear wheel 18, which meshes with a pinion 19, keyed on the lower end of the vertical shaft 13.

21 indicates a horizontal shaft mounted on the upper portion of the frame and provided at its forward end with a bevel pinion 22, which meshes with a bevel pinion 23, from the hub of which extends a horizontally disposed sleeve 24. The sleeve is provided with internal screw threads which are engaged by the threaded portion of a rack 25. The rack 25, meshes with a gear wheel 26, mounted on the upper end of the front fork 15.

Extending rearwardly from the transmission mechanism 4, is a shaft on which is secured a worm 28, which meshes with a worm gear 29, mounted on a horizontally disposed shaft, and on the ends of which are sprocket wheels 30. Around the sprocket wheels 30, and sprocket wheels 32, mounted on the rear drive shaft pass chains 31.

In operation, when the motor is coupled to the transmission mechanism by the clutch 3, power is transmitted to the rear wheels through the chains 31. The front wheels are also positively driven by means of the gears 6, 7, 10, and 11.

The construction at the upper end of the fork 15, is such that notwithstanding the fact that it carries the transmission mechanism for operating the front wheels, said fork may be readily turned by turning the handle 20, so as to steer the machine.

Having now fully described my said invention, what I claim and desire to secure by Letters Patent, is:

1. In a traction engine, the combination of a frame, the forward end of which is extended upwardly and is provided with a gear case, a yoke vertically slidably and rotatively mounted in the gear case, a shaft mounted in the yoke, front wheels secured to the shaft, a beveled gear wheel on one of the front wheels, a substantially vertical shaft mounted in the yoke, said latter shaft having a flange and an angular portion, a beveled gear wheel mounted on the angular portion of the vertical shaft and inclosed in the gear case, a spring interposed between the flange and the beveled gear, a counter shaft mounted on the frame, a beveled gear mounted on the upper end of the counter shaft and inclosed in the gear case and meshing with the beveled gear on the vertical shaft, a beveled gear on the lower end of the counter shaft, a power shaft having a beveled gear wheel which meshes with the beveled gear wheel on the counter shaft, a motor, transmission gears between the motor and the power shaft, rear wheels and means for transmitting power from the motor and the rear wheels.

2. In a traction engine, the combination of a frame, the forward end of which is extended upwardly and is provided with a gear case, a yoke vertically slidably and rotatively mounted in the gear case, a shaft mounted in the yoke, front wheels secured to the shaft, a beveled gear wheel on one of the front wheels, a substantially vertical shaft mounted in the yoke, said latter shaft having a flange and an angular portion, a beveled gear wheel mounted on the angular portion of the vertical shaft and inclosed in the gear case, a spring interposed between the flange and the beveled gear, a counter shaft mounted on the frame, a beveled gear mounted on the upper end of the counter shaft and inclosed in the gear case and meshing with the beveled gear on the vertical shaft, a beveled gear on the lower end of the counter shaft, a power shaft having a beveled gear wheel which meshes with the beveled gear wheel on the counter shaft, a motor, transmission gears including a worm carrying shaft interposed between the motor and the power shaft, a worm on the worm carrying shaft, a transverse shaft mounted on the frame, sprocket wheels on the transverse shaft, rear wheels, sprocket wheels on the rear wheels, and chains passing around the sprocket wheels.

FRANÇOIS THEILLIER.

Witnesses:
C. VAN VELSEN,
EMILE VAN NORNREEB.